United States Patent

Dickson et al.

[11] 4,214,207
[45] Jul. 22, 1980

[54] SWITCHING CIRCUIT FOR RADIOSONDE

[75] Inventors: Vernon E. Dickson; James G. C. Lee, both of Toronto; Gurbachan S. Saini, Markham, all of Canada

[73] Assignee: Sangamo Company Limited, Canada

[21] Appl. No.: 941,449

[22] Filed: Sep. 11, 1978

Related U.S. Application Data

[63] Continuation of Ser. No. 778,815, Mar. 17, 1977, abandoned.

[30] Foreign Application Priority Data

Sep. 10, 1976 [CA] Canada .................................. 260967

[51] Int. Cl.² .......................................... H04B 1/034
[52] U.S. Cl. .................................. 455/95; 340/177 R
[58] Field of Search .......................... 325/113, 115; 340/201 R, 207–209, 189 M, 177 R; 73/170 R

[56] References Cited

U.S. PATENT DOCUMENTS

| | | | |
|---|---|---|---|
| 2,381,009 | 8/1945 | Siderman | 325/113 |
| 2,790,967 | 4/1957 | Mlynczak | 325/113 |
| 3,132,301 | 5/1964 | Siderman et al. | 325/113 |
| 3,273,066 | 9/1966 | Ruhnke | 325/113 |
| 3,649,877 | 3/1972 | Friedman et al. | 73/170 R |

Primary Examiner—Robert L. Griffin
Assistant Examiner—Jin F. Ng
Attorney, Agent, or Firm—W. R. Sherman; Kevin McMahon

[57] ABSTRACT

A radiosonde comprising a transmitter, a modulating oscillator, a control circuit for the oscillator and sensing elements to be switched into and out of said control circuit, characterized in that a solid state switching circuit is utilized for switching the sensing elements into and out of said control circuit to produce atmospheric information signals and with the sensing elements out of the control circuit there is produced a reference signal which reflects essentially the same impedance from the solid state switching circuit as is reflected in the atmospheric information signals thereby providing for evaluation of the information signals.

19 Claims, 1 Drawing Figure

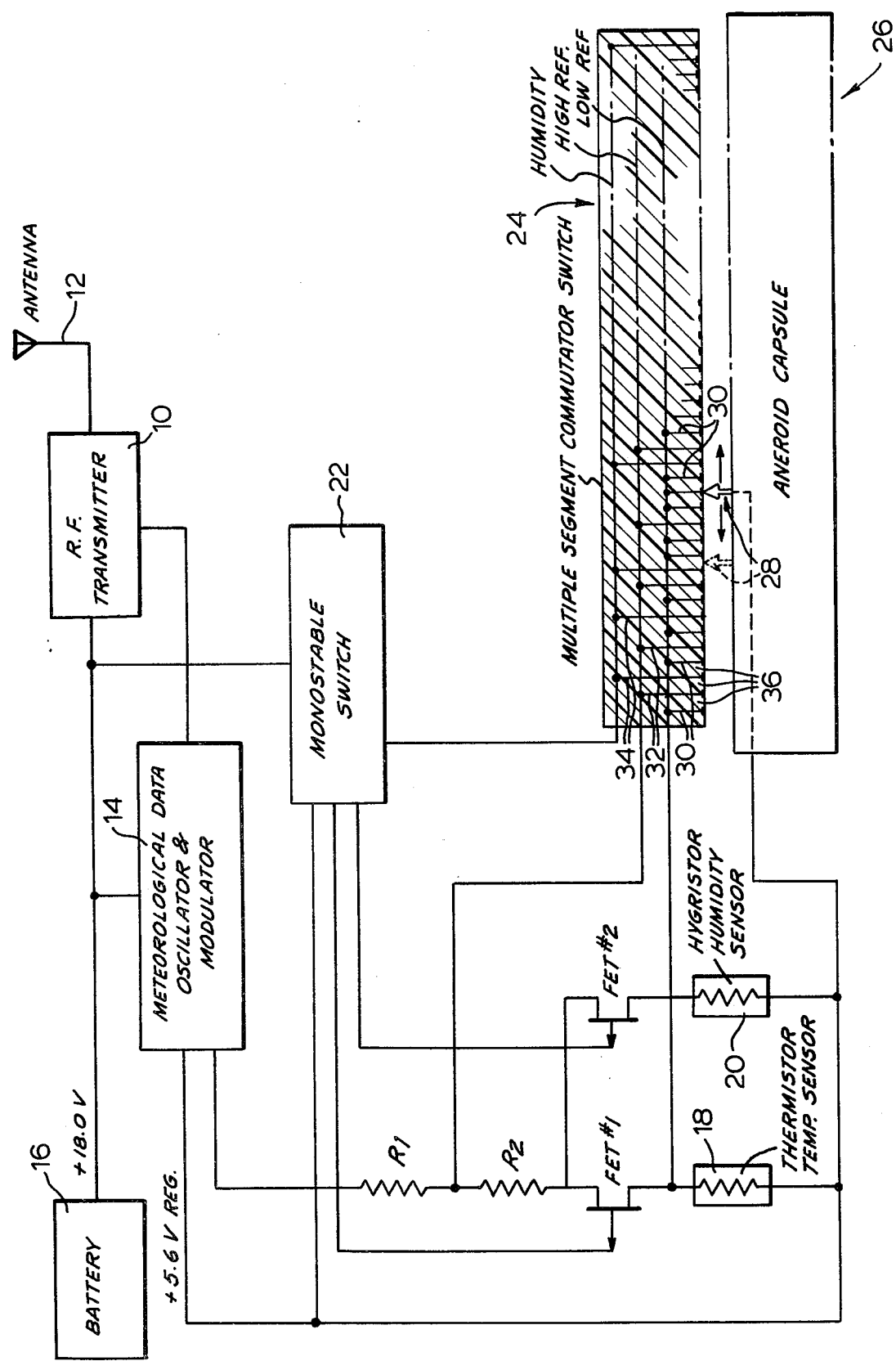

SWITCHING CIRCUIT FOR RADIOSONDE

This is a continuation of application Ser. No. 778,815, filed Mar. 17, 1977, now abandoned.

FIELD OF THE INVENTION

This invention relates to a novel switching circuit for switching the sensing elements of a radiosonde in the taking of upper air atmospheric measurements.

BACKGROUND OF THE INVENTION

A radiosonde is a device which is carried aloft into the upper air atmosphere by a sounding balloon for the purpose of measuring and humidity and temperature at different heights or barometric pressures reached by the unit in flight. Basically the radiosonde comprises a radio frequency transmitter having a given carrier frequency which is either frequency or amplitude modulated by an associated modulating oscillator whose frequency is determined by sensing elements, whose impedances are responsive to the respective atmospheric conditions they are to measure, which are switched into and out of the control circuit of the oscillator. The carrier frequency throughout most of the world assigned to radiosondes is usually 107 megahertz for weather ships or 403 or, more usually, 1680 megahertz when flown off land.

While radiosondes have developed with the electronics art insofar as the radio frequency and modulating oscillators are concerned, until the present invention it has been found necessary, in order to meet performance requirements to effect switching of the sensing elements into and out of the control circuit of the modulating oscillator by means of an electromagnetic relay or mechanical switch. Such a switch has the important advantage over other previously known switching arrangements of having contacts which have a low impedance which is not affected by the extreme temperature changes to which the switch is subjected. In this connection, it will be appreciated that a radiosonde must be inexpensive to produce since it is only flown once and yet the performance specifications are very tight and the environmental conditions severe. Probably the one most extreme environmental factor is the wide temperature range (+30° C. to −80° C.) that the device must operate under with a negligible effect on its performance. While the impedance characteristics of the electromagnetic relay or mechanical switch contacts are satisfactory, the disadvantages of an electromagnetic relay are cost, power consumption, mass and the susceptibility of its contacts to chatter, stick or burn. The mass of the electromagnetic relay itself and the capacity and size of the associated circuit elements which the relay's power consumption dictates adds to the hazard which present radiosondes present to jet aircraft. The chattering, sticking or burning of the relay contacts affects reliability of the radiosonde and of course the relay's cost is a serious drawback.

In attempting to find a switch to replace the electromagnetic relay the problem encountered has been the variable impedance and hence measuring errors which other switching introduces into the measuring or sensing element circuits particularly under the wide temperature changes, and, until the present invention, no other switching has been found which is acceptable.

BRIEF DESCRIPTION OF THE INVENTION

The primary objective of this invention is to provide a simple, compact, light weight, inexpensive switch using solid state technology that can be used for switching the sensing elements of a radiosonde to control the modulating frequency of the carrier while maintaining the requisite performance specifications.

According to the invention, acceptable solid state switching of the sensing elements is achieved by the provision of a reference signal which reflects the impedance of the solid state switching at the time the measurements are made by the sensing elements whereby the impedance changes of the solid state switching can be effectively taken into account.

The most important information which is obtainable from the radiosonde is temperature versus barometric pressure. In view of the present state of the art of temperature sensing elements or thermistors, temperature measurement accuracy to 0.1° C. is obtainable and desirable. On the other hand, humidity versus barometric pressure cannot be as accurately measured in view of the state of the known humidity sensing elements or hygristors.

To provide for the high degree of accuracy of temperature measurement the invention enables the same solid state device impedance to be incorporated into the modulating oscillator control circuit with the thermistor switched into the circuit and with the thermistor cut out of the circuit during the reference signal generation.

To optimize the humidity measurements the hygristor is switched into the modulating oscillator control circuit by a solid state device whose impedance, at least under one set of conditions, e.g. room temperature at ground level, substantially matches the impedance of the solid state device incorporated into the thermistor and reference signal circuits.

Because it is desirable for a further reference signal from the radiosonde to determine if the device is ascending or descending, the aforesaid reference signal is referred to as the low reference signal and the further reference signal as the high reference signal.

According to the preferred form of the invention, a calibrated aneroid capsule is utilized in conjunction with a commutator switch member or section to effect the switching of the solid state devices to produce the sensing element signals and the low and high reference signals.

DESCRIPTION OF THE DRAWINGS

The drawing is a schematic of a radiosonde circuit embodying the invention.

DETAILED DESCRIPTION OF THE DRAWINGS

With reference to the drawings, the radiosonde is shown as comprising a radio frequency transmitter 10 feeding an antenna 12 being modulated by a "meteorological data" oscillator and modulator 14 and powered by a battery 16.

The control circuit for controlling the modulator oscillator 14 for providing the temperature versus barometric pressure, humidity versus barometric pressure, the low reference, and high reference signals, includes a fixed resistance made up of $R_1$ and $R_2$, field effect transistor No. 1 (FET 1), field effect transistor No. 2 (FET 2), Thermistor 18, Hygristor 20. Monostable switch 22, multiple segment commutator switch section 24 and aneroid capsule 26.

In the particular embodiment of the invention illustrated, the physical movement of the wall of the aneroid capsule 26 is mechanically amplified to operate a contact 28 over the multiple segment commutator type switch section 24. The multiple conducting elements or contacts 30, 32, 34 of this single pole commutator type switch are connected in 3 predetermined parallel groups. The conducting elements 30 are connected into the low reference circuitry of the modulating oscillator 14 while the conducting elements 32 and 34 are connected into the high reference and humidity circuitry respectively of the modulating oscillator.

The radiosonde aneroid capsule 26 is calibrated in association with its commutator switch 24 prior to flight in a vacuum chamber, and its calibration is recorded on a paper tape. The tape is a record of pressure against each conducting element or contact of the commutator switch. As hereinafter more fully explained, the radiosonde in flight transmits one of four information signals depending upon the barometric pressure of its environment which determines the element of the commutator switch that is conducting.

The most important information is temperature versus barometric pessure which is transmitted whenever contact 28 rests on a non-conducting segment 36 of the commutator switch. Humidity versus pressure, low reference versus pressure and high reference versus pressure are transmitted in a known pattern by the three parallel groupings of the commutator switch elements 30, 32 and 34.

High and low reference signals are fixed frequencies that are transmitted periodically in set sequence with respect to barometric pressure. Their purpose is twofold: (1) The low reference is a selected frequency that is used by the ground station to know that the modulating oscillator is functioning correctly in flight; (2) The sequence of the low reference and high reference signals on the commutator tells a ground observer as to whether the pressure is increasing or decreasing, and this is particularly important at high altitudes in the determination of the bursting point of the sounding balloon.

The solid state switch circuitry of the control circuit of the modulator oscillator 14 includes the "monostable switch" 22 plus FET 1 and FET 2. In this preferred embodiment of the invention, two field effect transistors, FET 1 and FET 2 are used, but it will be appreciated that other solid state devices could be used as well for this application.

When contact is made by switch contact 28 to the "humidity circuit", that is, one of the contacts 34 in the commutator switch, by action of the aneroid capsule, the circuit is closed to the monostable switch 22. The monostable switch then applies a voltage, e.g. for the one typically available field effect transistor, greater than +12 volts to the gate of FET 1 to cut-off conduction and voltage of less than +6 volts to place FET 2 in the conducting state. At this point, $R_1$, $R_2$, FET 2 and the humidity sensor or hygristor 20 are connected in series with the modulating oscillator and will determine the frequency of the oscillator. As the hygristor encounters different humidity conditions, its resistance will change and this change will be reflected in the frequency of the modulating oscillator.

When the humidity circuit is interrupted in the commutator switch, by contact 28 moving off contact 34, the monostable switch 22 reverses the voltages applied to FET 1 and FET 2, causing FET 21 to conduct and FET to switch to the non-conducting state.

As long as the contact 28 of the commutator switch stays in an insulating segment 36, the temperature sensor or thermistor 18 will be in series with conducting FET 1 and $R_1$ and $R_2$ and the modulating oscillator. Consequently, the oscillator modulation will be a function of the temperature dependent resistance of the temperature sensor 18.

When the contact 28 of the commutator switch moves to a low reference segment or contact 30, this places a direct short across the temperature sensor 18. The modulating oscillators see $R_1$ and $R_2$ in series with FET 1, which is still in the conducting state, and its frequency changes to the low reference signal. The impedance of the field effect transistor FET 1 hence appears in both the low reference and temperature sensing circuit.

When the commutator switch contact 28 moves to a "high reference" segment or contact 32, a short is placed across $R_2$, FET 1 and the temperature sensor 18. Consequently, the modulator oscillator sees the lower external resistance $R_1$ and changes frequency to the selected high reference signal.

As mentioned, the most important information is temperature versus barometric pressure and it will be appreciated that since FET 1 is included in the control circuit of the modulating oscillator 14 for both the temperature sensor signal and the low reference signal, any change in the impedance of FET 1 over the wide temperature range to which it is exposed will be reflected in both signals and will have only a second order effect.

While relative humidity cannot be measured too accurately because of the accuracy limitations of present hygristors, it is desirable that no significant error be introduced into the humidity measurements by the change of impedance of FET 2 under the wide temperature changes to which it is subjected. As a result, FET 2 is selected to have an impedance substantially matched to the impedance of FET 1 at room temperature. Thus, while FET 1 is included in the oscillator control circuit when the low reference signal is generated, its essential match FET 2 is connected in the oscillator control circuit during the humidity signal so that the humidity signal can be related to the low reference signal with no serious error being introduced by any change in impedance of FET 2 during flight.

It will be noted that the high reference circuit does not go through the solid state switch. The exact frequency of the high reference circuit is unimportant as long as it is greater than the low reference frequency, so a determination can be made as to whether the radiosonde is ascending or descending.

While a specific embodiment of the invention has been described it will be understood that variations may be made without departing from the spirit of the invention or scope of the appended claims.

What we claim is:

1. A radiosonde comprising a radio frequency transmitter, a modulating oscillator therefor, a control circuit for said modulating oscillator comprising a fixed resistance, a thermistor, a hygristor, a first field effect transistor for completing said control circuit when in a conducting mode through said thermistor, first transistor, and said fixed resistance, a second field effect transistor for completing said control circuit when in a conducting mode through said hygristor, second transistor and said fixed resistance, a monostable switch connected to said transistors and, until a signal is applied thereto, maintaining said first transistor conducting and said second transistor non-conducting, and a barometric pressure calibrated switch arrangement to:
- apply a signal to said monostable switch at a first series of predetermined barometric pressures to render said second transistor conducting and said first transistor nonconducting to produce humidity information signals;
- short circuit said thermistor with said first transistor conducting at a second series of predetermined barometric pressures to produce a low reference signal reflecting the impedance of the impedance path presented by said first transistor;
- short circuit said thermistor, first transistor, and a portion of said fixed resistance at a third series of predetermined barometric pessures to produce a high reference signal for indicating direction of vertical movement of the radiosonde,
- the control circuit, in the absence of a signal to the monostable switch or thermistor shorting by said switch arrangement, producing temperature information signals which occur at barometric pressures which have also been predetermined.

2. A radiosonde as claimed in claim 1 in which said barometric pressure calibrated switch arrangement comprises a longitudinal commutator switch section having a plurality of contacts spaced by insulating segments, and an aneroid capsule having a moving contact adapted to move along said commutator section in response to changing barometric pressures, said commutator contacts having a predetermined pattern with a first set of said contacts being connected in parallel and to said monostable switch, to deliver a signal thereto upon being made by said moving contact to provide humidity information signals, a second set of contacts being connected in parallel to short out said thermistor on being made by said moving contact to produce a low reference signal, and a third set of contacts being connected in parallel to short out said thermistor, first transistor and a portion of said fixed resistance upon being made by said moving contact to produce a high reference signal, said moving contact when riding on said insulating segments rendering said control circuit in a mode to produce temperature information signals.

3. A radiosonde as claimed in claim 1 in which said transistors have essentially matched impedances.

4. In a radiosonde of the type having a radio frequency transmitter and modulating means therefor; a pressure sensitive device; a multiple segment commutator switch having a plurality of contacts, a first group of which are interconnected and represent the transmission by the sonde of reference signals, a second group of which are interconnected and represent the transmission by said sonde of atmospheric information signals; a wiper movable by said pressure sensitive device along said commutator switch in response to changes in barometric pressure; first and second atmospheric information sensing elements; the improvement comprising:
- first and second controlled semiconductor switch devices coupling said first and second sensing elements respectively to said modulating means;
- control means for receiving control information and in response thereto opening and closing selectively said semiconductor devices;
- said first group of interconnected contacts being coupled to said modulating means and bypassing said first atmospheric information sensing element, whereby said radiosode transmits reference signals when said wiper connects to any contact of said first group;
- said second group of contacts being coupled to said control means so that when said wiper is coupled to said control means through a contact of said second group, said control means opens said first semiconductor switch device and closes said second semiconductor switch device to couple thereby said second atmospheric information sensing element to said modulating means for transmission of second atmospheric information signals.

5. The radiosonde of claim 4 wherein the coupling of said first group of controls bypasses said first information sensing element but not said first semiconductor switch device, and wherein the circuit paths from said first information sensing element and said first group of contacts to said modulating means are common through the first semiconductor switch to said modulating means.

6. The radiosonde of claim 5 wherein said multiple segment commutator switch further includes a third group of interconnected contacts, said first group representing transmission of a low reference and said third group representing transmission of a high reference, said third group being coupled to said modulating means at a point which bypasses both said information sensing elements and said semiconductor switches.

7. The radiosonde of claims 4, 5 or 6 wherein said first information sensing element is coupled to said modulating means when said wiper is between contacts of said commutator switch.

8. The radiosonde of claim 7 wherein said first and second information sensing elements are respectively a temperature sensor and a humidity sensor, and said pressure sensitive device is an aneroid capsule.

9. The radiosonde of claim 6 wherein said control means is a monostable switch.

10. A radiosonde comprising:
- a transmitter and means for modulating said transmitter;
- a multiple segment switch element having a plurality of contacts including a series of interconnected contacts;
- a wiper movable along said multiple segment switch element and electrically connecting to differing ones of said contacts during wiper movement;
- a pressure sensitive device operatively engaging said wiper and moving said wiper along said multiple segment switch element in response to pressure changes;
- an atmospheric information sensing element;
- a fixed resistance coupled to said modulating means; and
- a switching device coupling said modulating means to said atmospheric information sensing element via said fixed resistance;
- said series of contacts being coupled to said modulating means via a portion of said fixed resistance and bypassing said information sensing element and said switching device so that when said wiper connects electrically to any contact of said series, reference signals are transmitted by said sonde and atmospheric information signals are transmitted at certain other positions of said wiper along said multiple segment switch element.

11. A radiosonde comprising:

a transmitter and means for modulating said transmitter;

an atmospheric information sensing element having two terminals;

a multiple segment switch element having a plurality of contacts including a series of interconnected contacts which are coupled to one terminal of said sensing element;

a wiper movable along said multiple segment switch element so as to electrically connect to different ones of said contacts;

means for coupling said wiper and the other terminal of said sensing element to a common potential;

a pressure sensitive device operatively engaging said wiper and moving said wiper along said multiple segment switch element in response to pressure changes;

a semiconductor switching device coupling both said one terminal of said sensing element and said series of interconnected contacts to said modulating means;

whereby, when said wiper is connected to one of said series of interconnected contacts, said wiper and multiple segment switch element serve to short circuit said sensing element, said switching device presenting the same impedance when said radiosonde transmits reference signals when said wiper electrically connects to any contact of said series and transmits atmospheric information signals at certain other positions of said wiper along said multiple segment switch element.

12. The radiosonde of claim 11 further comprising a second atmospheric information sensing element and a second semiconductor switching device coupled in series between said modulating means and said common potential.

13. The radiosonde of claim 12 further comprising a fixed resistance coupling said modulating means to said semiconductor switching device.

14. The radiosonde of claim 13 wherein said multiple segment switch element includes a second series of interconnected contacts, and further comprising a control switch coupled to said second series of interconnected contacts and to said first and second semiconductor switching devices, said control switch opening said first switching device and closing said second switching device when said wiper is moved to any contact in said second series of interconnected contacts.

15. The radiosonde of claim 14 wherein said first and second semiconductor switching devices are respectively first and second field effect transducers gated by said control switch, and wherein said pressure sensitive device is an aneroid capsule.

16. A radiosonde comprising:

a transmitter and means for modulating said transmitter;

a multiple segment switch element having a plurality of contacts including first and second series of interconnected contacts;

a wiper movable along said multiple segment switch element and electrically connecting to differing ones of said contacts during wiper movement;

a pressure sensitive device operatively engaging said wiper and moving said wiper along said multiple segment switch element in response to pressure changes;

first and second atmospheric information sensing elements;

a fixed resistance a first switching device coupling said modulating means to said first atmospheric information sensing element via said fixed resistance;

a second switching device coupling said modulating means to said second atmospheric information sensing element via said fixed resistance;

a control switch coupled to said second series of interconnected contacts and to said first and second switching devices, said control switch opening said first switching device and closing said second switching device when said wiper is moved to any contact in said second series;

said first series of contacts being coupled to said modulating means and bypassing said information sensing elements and said switching devices so that when said wiper connects electrically to any contact of said first series, reference signals are transmitted by said sonde and atmospheric information signals are transmitted at certain other positions of said wiper along said multiple segment switch element.

17. The radiosonde according to claim 16 wherein said first and second switching devices are respectively first and second field effect transistors gated by said control switch, and wherein said pressure sensitive device is an aneroid capsule.

18. A radiosonde comprising:

a transmitter and means for modulating said transmitter;

a multiple segment switch element having a plurality of contacts including first and second series of interconnected contacts representing the transmission of reference signals;

a wiper movable along said multiple segment switch element and electrically connecting to differing ones of said contacts during wiper movement;

a pressure sensitive device operatively engaging said wiper and moving said wiper along said multiple segment switch element in response to pressure changes;

first and second atmospheric information sensing elements;

a fixed resistance;

a first semiconductor switching device coupling both said first atmospheric information sensing element and said first series of contacts to said modulating means via said fixed resistance;

a second switching device coupling said modulating means to said second atmospheric information sensing element via said fixed resistance;

a control switch coupled to said second series of interconnected contacts and to said first and second switching devices, said control switch opening said first switching device and closing said second switching device when said wiper is moved to any contact in said second series;

said first switching device presenting the same impedance when said radiosonde transmits reference signals when said wiper electrically connects to any contact of said first series and transmits atmospheric information signals at certain other positions of said wiper along said multiple segment switch element.

19. The radiosonde according to claim 18 wherein said first and second switching devices are respectively first and second field effect transistors gated by said control switch, and wherein said pressure sensitive device is an aneroid capsule.

* * * * *

UNITED STATES PATENT AND TRADEMARK OFFICE
CERTIFICATE OF CORRECTION

PATENT NO. : 4,214,207

DATED : July 22, 1980

INVENTOR(S) : Vernon E. Dickson et al.

It is certified that error appears in the above-identified patent and that said Letters Patent is hereby corrected as shown below:

Column 1, line 15, "measuring and" should read -- measuring the --.

Column 5, line 17, "portionof" should read -- portion of --.

Column 5, line 18, "pessures" should read -- pressures --.

Signed and Sealed this

Seventh Day of September 1982

[SEAL]

Attest:

Attesting Officer

GERALD J. MOSSINGHOFF

Commissioner of Patents and Trademarks